Nov. 28, 1961 L. I. KAPLAN 3,010,172
INTEGRALLY REINFORCED V-BAND CLAMP
Filed March 2, 1960
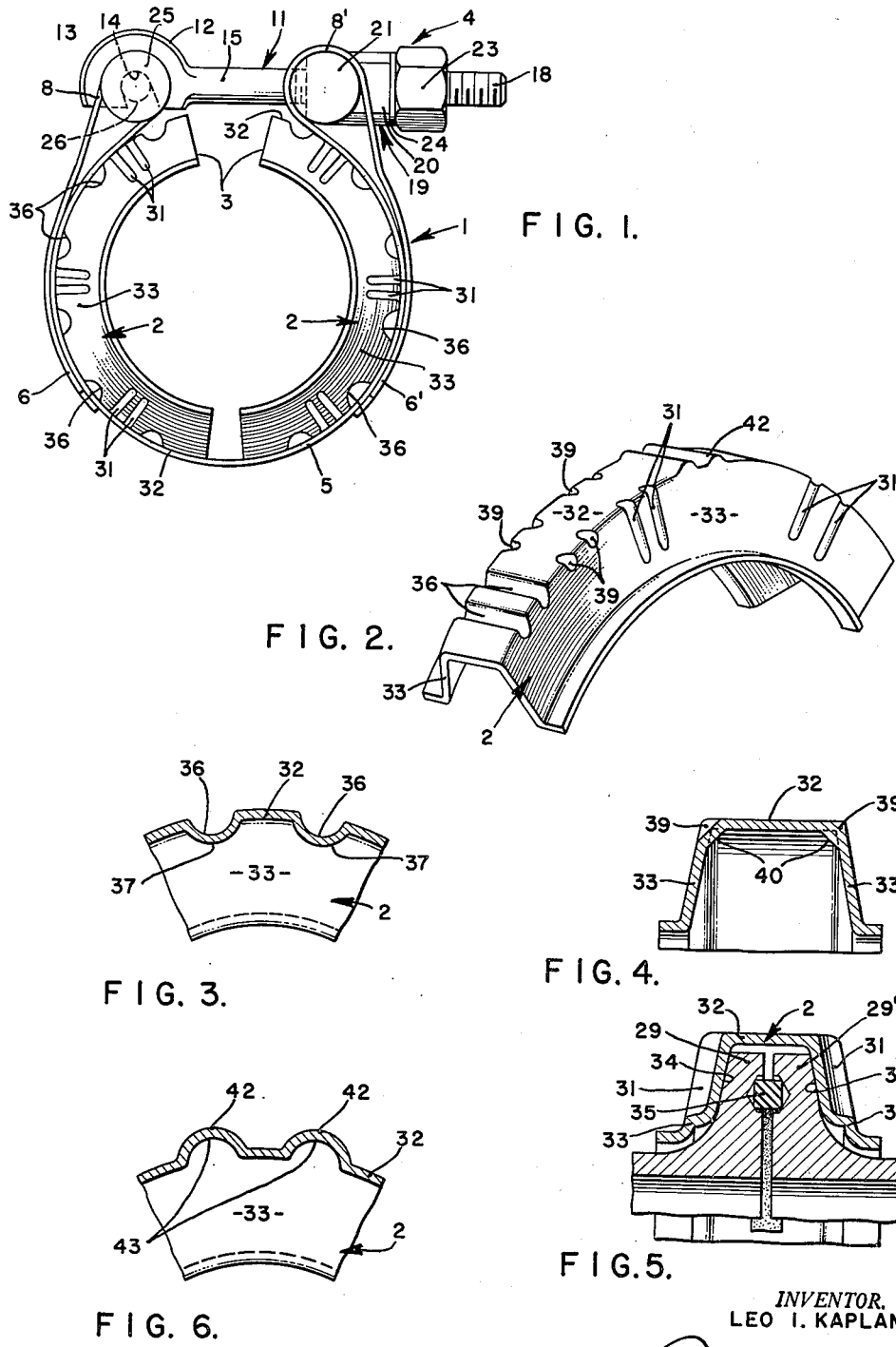
FIG. 1.
FIG. 2.
FIG. 3.
FIG. 4.
FIG. 5.
FIG. 6.
INVENTOR.
LEO I. KAPLAN
BY 
ATTORNEYS.

United States Patent Office 3,010,172
Patented Nov. 28, 1961

3,010,172
INTEGRALLY REINFORCED V-BAND CLAMP
Leo I. Kaplan, Sunland, Calif., assignor to Poly Industries, Inc., Pacoima, Calif., a corporation of California
Filed Mar. 2, 1960, Ser. No. 12,443
2 Claims. (Cl. 24—279)

This invention relates to couplings or clamps of the type used to connect the end flanges of adjoining tube sections or pipes in a sealed relationship and which comprise a coupling collar embodying a plurality of annular segments of V section having inwardly diverging side walls adapted to apply axial pressure to the flanges as the segments are constricted toward the axis of the coupling. The invention deals more particularly with clamps having annular segments of V section which are strengthened by the formation of corrugations or beads in their various surfaces.

One of the problems characterizing the use of V-band clamps is that the inwardly diverging walls of the annular segments tend to spread as they are tightened about the tubular flanges of the pipes or conduits they are holding in end-to-end sealed relationship. The resulting joint may be less tight than otherwise and if the spread between the walls is great enough the seal between the flanges is broken. Spreading of the walls of the V-shaped segments increases with temperature and the problem is especially acute, for example, in high speed aircraft and in missiles where the temperatures encountered are very high.

In the prior practice, the problem of the spreading walls of the V-shaped segments was solved by using thicker metal which had the serious disadvantage in the aircraft and missile fields of increasing the weight and, in addition, the heavier metal was more costly.

According to the present invention the strengthening of the V-segments to prevent spreading has been accomplished by forming corrugations or beads in the various surfaces of the segments. This may be done by stamping operations in which one or more sides of the segment are formed with integral re-entrant grooves, channels which, viewed from the opposite face, are elongated beads, ribs or ridges. These reinforcing elements may extend less than the entire width of the wall of which they form a part but in the preferred form extend to and intersect an adjacent, intersecting, angularly extending wall, the extent of the intersection laterally of the intersected wall depending in each instance upon the depth of the groove or channel. The effect in all cases is that the reinforcing element in one wall connects to the adjacent angularly extending wall for a distance extending from the interior angle to provide a bridging connector the sides of which would be put in tension by any force tending to increase that angle.

Another problem occurring in the use of V-band clamps is the development of objectionably high friction as the annular segments of V section are drawn tightly about the flanges of the pipes which the clamp secures in end-to-end relationship. The present invention greatly diminishes that friction by reducing the area of contact of the surfaces of the clamp and the flanges. This is done by providing re-entrant portions in the exterior surfaces of the walls to form spaced inwardly-extending projections which contact the flanges.

Accordingly, it is a primary object of the invention to provide an improved V-band type coupling.

Another object of the invention is to provide a V-band type coupling in which the annular segments of V section are strengthened by spaced integrally formed elements.

It is another object of the invention to provide a V-band clamp in which the annular segments of V section have an improved strength-to-weight ratio.

It is still another object of the invention to provide a V-band clamp in which the annular segments of V section have integral strengthening means to prevent spreading of their diverging walls.

It is still another object of the invention to provide a V-band clamp in which the friction between the annular segments of V section and the flanges developed during the tightening of the clamp is greatly reduced.

It is a still further object of the invention to provide an improved V-type band clamp in which the flange contacting area on the walls of the segments of V section is greatly reduced.

These and other more specific objects will appear upon reading the following specification and claims and upon considering in connection therewith the attached drawings to which they relate.

Referring now to the drawing in which a preferred embodiment of the invention is illustrated.

FIGURE 1 is a side elevational view of a V-band clamp embodying the invention;

FIGURE 2 is an enlarged fragmentary perspective view of an annular V-band segment illustrating various types of integral strengthening means;

FIGURE 3 is a fragmentary longitudinal section of an annular V-band segment having strengthening re-entrant portions in its outer circumferential surface;

FIGURE 4 is a cross-sectional view of an annular V-band segment showing strengthening portions formed in the corners of the outer wall and the diverging side walls;

FIGURE 5 is a cross-sectional view of an annular V-band segment illustrating strengthening portions in the side walls extending downwardly from the outer circumferential surface and showing a pair of end flanges secured in sealed relationship; and FIGURE 6 is a fragmentary longitudinal section similar to FIGURE 3 but with integral strengthening members projecting outwardly from the circumferential surface of the segment.

Referring again to the drawing, there is illustrated a band coupling 1 of the type commonly referred to in the art as a V-band clamp. Clamp 1 includes a plurality of circular channeled collars, rings or V-bands 2 preferably V-shaped in cross section, the ends 3 of which are spaced so that they can be displaced when the clamp is tightened or loosened, and a connector mechanism 4. An outer flexible band or strap 5 is welded to each of the parts of the inner V-shaped ring 2 and has its ends 6, 6' looped back and permanently secured to form loops 8, 8', respectively, each loop being centrally slotted in an unshown but conventional manner.

The connector mechanism 4 includes, in cooperation with the loops 8, 8', a hook bolt 11 having a head 12 with flat sides 13 in which a cut-away portion forms a hook 14 normally positioned in the slotted end of loop 8. Extending from the bolt head 12 and through the slotted end of loop 8' is shank 15, the end portion of which is threaded at 18. On the threaded end of the shank is a slidable trunnion unit 19, its pair of oppositely projecting trunnions 21 seated in the loop 8' upon opposite sides of the unshown central slot of the loop. A nut 23 threadedly engages threaded end 18 of shank 15 and bears against washer 24 in abutment with the outer end of trunnion shank 20.

Positioned in loop 8 is a second trunnion 25 having a reduced central portion 26 in alignment with the central slot and with the bolt head 12. When the bolt 11 is in its engaged position, the hook 14 extends into the bifurcated loop 8 and over the reduced portion 26 of trunnion 25, as shown in FIGURE 1. In order to tighten the outer band 5, as in drawing axially together a pair of tube flanges 29, 29', as shown in FIGURE 5, nut 23 is tightened to force the trunnion 21 forwardly upon the shank of the bolt, or stated differently, to draw the hook bolt 11, and the trunnion 25 and loop 8 to which it is connected, toward the trunnion unit 19 and the loop 8' to which it is connected. Thus, strap loops 8, 8' may be displaced toward and from each other, a relationship determined by the position of the trunnion unit 19 upon the threaded end 18 of the bolt shank 15.

In FIGURES 1 through 6, various strengthening portions in the V-segments 2 are illustrated. In each type an indentation is made in one surface and it is extended through the other side to form an integral projection. In FIGURES 1, 2 and 5, stiffening or strengthening portions in the side walls 33 of the V-segments 2 are formed by elongated indentations 31 extending radially inwardly from the outer circumferential surface of wall 32, and by projections 34 extending axially inwardly of the indentations 31. The projections 34 are in contact with the tubular flange members 29, 29' to hold them in sealed end-to-end relationship, with a resilient sealing ring 35 between them. This type of strengthening portion formed by the integral indentation 31 and projection 34, in addition to strengthening the side walls 33 and the angle between the side walls and the outer circumferential wall to prevent spreading by the flanges 29, 29', also reduces the friction which develops between the inner surfaces of V-segments and the radially outwardly converging surfaces of the flanges as the clamp is tightened on the flange and relative sliding necessarily takes place. In other words, the friction creating surface is reduced from the entire arc of the V-segments in contact with the converging surfaces of the flanges, as in the prior art, to the spaced projections 34.

A second type of strengthening, shown in FIGURES 1 and 2, comprises axially directed indentations 36 in the outer surface of circumferential wall 32, and their complementary projections 37, shown in FIGURE 3.

In FIGURES 2 and 4, strengthening is provided only at the corners or angles between the outer wall 32 and the inwardly diverging walls 33. This strengthening is provided by indentations 39 extending inwardly from the outer surfaces of the corners and by their complementary projections 40 extending inwardly into the channel portion of the segment.

Still another type of strengthening in segment 2 is shown in FIGURES 2 and 6 and is provided by projections 42 extending radially outwardly of the circumferential wall 32 with corresponding indentations 43 in the inner surface of the wall.

All of the strengthening designs intersect and bridge the included angle between the side walls 33 and the outer circumferential wall 32 and, in the manner of structural bridging elements, provide rigidity and strength. In addition, the reinforcements which have length along a side, or along the outer wall 32, strengthen the wall itself.

While in the forms illustrated simple rounded indentations have been shown, other contours are suitable.

While the particular integrally reinforced V-band clamp herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a clamping device for coupling together flanged pipe sections and the like, said clamping device comprising a wide circular band having adjustable means interconnecting the opposite ends thereof after embracing the juxtaposed flanged ends of adjacent pipe sections; that improvement which comprises a plurality of similar arcuate clamping sections spaced circumferentially along the interior of said band and attached thereto in spaced-apart end-to-end relation, said clamping sections being channel-shaped in cross section and opening inwardly with their side walls diverging similarly and oppositely to the converging remote radial faces of the flanges of a pair of pipe sections, the inner rim edges of said side walls being turned outwardly away from one another to provide a pair of reinforcing ribs lying in a generally common cylindrical surface with respect to one another, elongated bead-like identations extending radially of said side walls with the rounded crests thereof lying inwardly of the adjacent diverging side walls to either side thereof, the inner radial ends of said indentations terminating adjacent but short of said outturned rim edges of said side walls, and the outer radial ends of said indentations opening outwardly through the web portions of said channel-shaped clamping sections, there being a plurality of said bead-like indentations formed in both side walls of each of said clamping sections, said indentations being highly effective in reinforcing the side walls of said clamping sections against lateral spreading and the rounded facing crests thereof on the opposed side walls of said clamping sections having substantially radial line contact with the coupling flanges and offering minimum resistance to relative movement over the surface thereof during tightening of said clamping device.

2. A clamping device as defined in claim 1 characterized in the provision of a plurality of elongated relatively narrow and shallow bead-like indentations extending transversely of the web portion of said clamping sections and spaced circumferentially thereof with respect to said radial indentations.

References Cited in the file of this patent

UNITED STATES PATENTS

| | | |
|---|---|---|
| 2,675,253 | Stade | Apr. 13, 1954 |
| 2,717,788 | Rynes | Sept. 13, 1955 |
| 2,834,087 | Herman | May 13, 1958 |